United States Patent [19]
Cordery

[11] Patent Number: 6,137,496
[45] Date of Patent: Oct. 24, 2000

[54] ELECTRONIC GRAPHIC SYSTEM

[75] Inventor: John Kenneth Cordery, Newbury, United Kingdom

[73] Assignee: Quantel Limited, Newbury, United Kingdom

[21] Appl. No.: 09/021,219

[22] Filed: Feb. 10, 1998

[30] Foreign Application Priority Data

Feb. 13, 1997 [GB] United Kingdom .................... 9702957

[51] Int. Cl.⁷ ..................................................... G06F 15/00
[52] U.S. Cl. ............................................................. 345/433
[58] Field of Search ..................................... 345/429, 431, 345/441, 442, 443, 121, 141, 142

[56] References Cited

U.S. PATENT DOCUMENTS

| | | | |
|---|---|---|---|
| 5,511,157 | 4/1996 | Wang | 345/438 |
| 5,861,889 | 1/1999 | Wallace et al. | 345/438 |

FOREIGN PATENT DOCUMENTS 0441499  8/1991  European Pat. Off. .

OTHER PUBLICATIONS

Screens of "CorelDRAW 6", 1 page (5 screens) 1996.

*Primary Examiner*—Phu K. Nguyen
*Attorney, Agent, or Firm*—Cooper & Dunham LLP

[57] ABSTRACT

An electronic graphic system includes an image store for storing in a multiplicity of storage locations data representing a multiplicity of image pixels which when displayed together form an image. A user operable input device generates control data in response to user operation thereof. An implement data store stores data defining a patch of implement pixels which together represent a profile of a drawing implement. A processor is connected to receive the control data from the user operable input device and responsive to the control data to identify a patch of storage locations in the image store, to read image data from the patch of storage locations, to modify the thus read image data using the patch of implement pixels in the implement data store and to write the thus modified image data back to the patch of storage locations in the image store, whereby in response to continuous operation of the input device a series of overlapping patches of image data are modified to create data representing a line in the image. A monitor displays an image represented by data input thereto. The system is operable in a preview mode in which display data is derived from the data in the implement data store, which display data defines an image comprising a graphical representation of the profile of the drawing implement, and in response to operation of the user operable input device to effect modifications to the graphical representation of the profile and corresponding to the data in the implement data store, the image defined by the display data further comprising an image defined by the data in the image store in response to control data corresponding to the single position being generated by the user operable input device, the system in the preview mode thereby enabling a user specified implement profile to be defined.

27 Claims, 3 Drawing Sheets

ELECTRONIC GRAPHIC SYSTEM

The invention relates to an electronic graphic system.

Electronic graphic or image systems in which the painting or drawing of a colour image can be simulated, or a portion of one image can be merged into another by electronic means are well known. One such graphic system is described in our British patent number 2,089,625 and corresponding U.S. Pat. No. 4,514,818, the teachings of which are incorporated herein by reference. This system includes a user operable input device which may be used by the user to select from a range of colours and a range of intensities and to choose from a set of notional drawing implements for use in the painting or drawing.

When a colour is chosen by the user, values representing the components of the selected colour are stored in a colour register. An implement is chosen by selecting from among different implement representations displayed on a display screen and the selected implement is defined by parameters conforming to a 3-dimensional surface representing the profile of the implement. Generally speaking the implement profile will have a high centre falling away to a lower value toward the periphery of the profile although other profiles may, of course, be defined. The implement profile represents the notional distribution of colour which would be applied by the implement to the image over the area of the image which it covers.

The user operable input device is preferably a touch tablet and stylus combination. The touch tablet is arranged to generate position signals designating the position of the stylus relative to the touch tablet when the stylus is brought into proximity. When the stylus is applied to the touch tablet a pressure signal representing the pressure applied via the stylus to the touch tablet is output from the stylus and stored in a pressure signal register. Position signals are output at regular intervals from the stylus/touch tablet device. For some implements, representing say paint brushes, implement data is generated for each movement of the stylus by the distance between picture points or similar distance, whilst for other implements, say air brushes, implement data is generated at regular time intervals, even if the stylus is held stationary on the touch tablet.

When a position signal is produced, new video signals (pixels) are derived for every picture point in the patch covered by the selected implement. An image store is provided and each new pixel is written at the appropriate picture point in the store. Such new pixels are derived by a processing circuit in accordance with the selected colour data and the distribution of the selected implement, and in response also to the pressure applied to the stylus and to the value of the pixel previously stored at the respective picture point in the store.

The user, who it is envisaged would normally be an artist lacking experience in the use of computer based systems, paints or draws by choosing a desired colour and implement and then manipulating the stylus, causing the touch tablet to generate a series of position signals which define the path or positioning of the stylus. The processing circuit reads pixels from the image store for a patch of picture points in response to each position signal and these pixels are blended by the processor with signals representing the chosen colour in proportions depending upon the respective values of the brush profile and pressure. The blend is then written back to the picture store replacing the pixels previously stored therein.

In general, the blending process is carried out a number of times for each picture point in the image store whether the implement is moving or stationary (assuming in the case of the moving implement that the patch covered by the implement is larger than the spacing between picture points). The final proportion will depend on the number of processing operations performed per pixel.

To enable the user to observe his creation, the stored picture is read repeatedly and the pixels are applied to a TV-type colour monitor, so that the build-up of the picture can be observed. Of course such systems are not limited to TV-type formats and any suitable video format may be adopted. The system described avoids the problem of jagged edges in the image, an unpleasant stepping appearance normally associated with lines not lying horizontally or vertically in a raster display.

In our co-pending British Patent Application No. 9618668.9, the teachings of which are incorporated herein by reference, there is described an electronic graphic system in which a user may input parameters defining a profile of a drawing implement. One way in which the parameters may be input is by manipulation of a graph representing a section through a circular brush profile. The system comprises a monitor on which the graph is displayed and user operable means such as a stylus and touch tablet device. The system is arranged to respond to manipulation of the stylus on the touch tablet by modifying the graph, thereby enabling the user to manipulate the profile of a drawing implement.

According to one aspect of the invention there is provided an electronic graphic system for simulating painting or drawing in an electronic environment, the system comprising: a user operable device for generating control data in response to user manipulation thereof; a processor responsive to the control data for generating implement data defining a user specified painting or drawing implement; and a monitor for displaying an image represented by data input thereto; and wherein the processor is operable in a preview mode to output to the monitor data representing a patch that would be painted or drawn by placing the user specified implement at a fixed position in an image.

According to another aspect of the invention there is provided a method of simulating painting or drawing in an electronic environment, the method comprising: generating control data; generating implement data defining a user specified painting or drawing implement in response to the control data; displaying on a monitor an image represented by image data; and operating in a preview mode by outputting to the monitor data representing a patch that would be painted or drawn by placing the user specified implement at a fixed position in an image.

The invention also provides an electronic painting apparatus in which a painting implement can be defined by a user, and a representation of a patch or a line painted using the user defined implement is displayable on a monitor to enable the user to preview the defined implement.

The above and further features of the invention are set forth with particularity in the appended claims and together with advantages thereof will become clearer from consideration of the following detailed description of an exemplary embodiment of the invention given with reference to the accompanying drawings.

Figure 1:
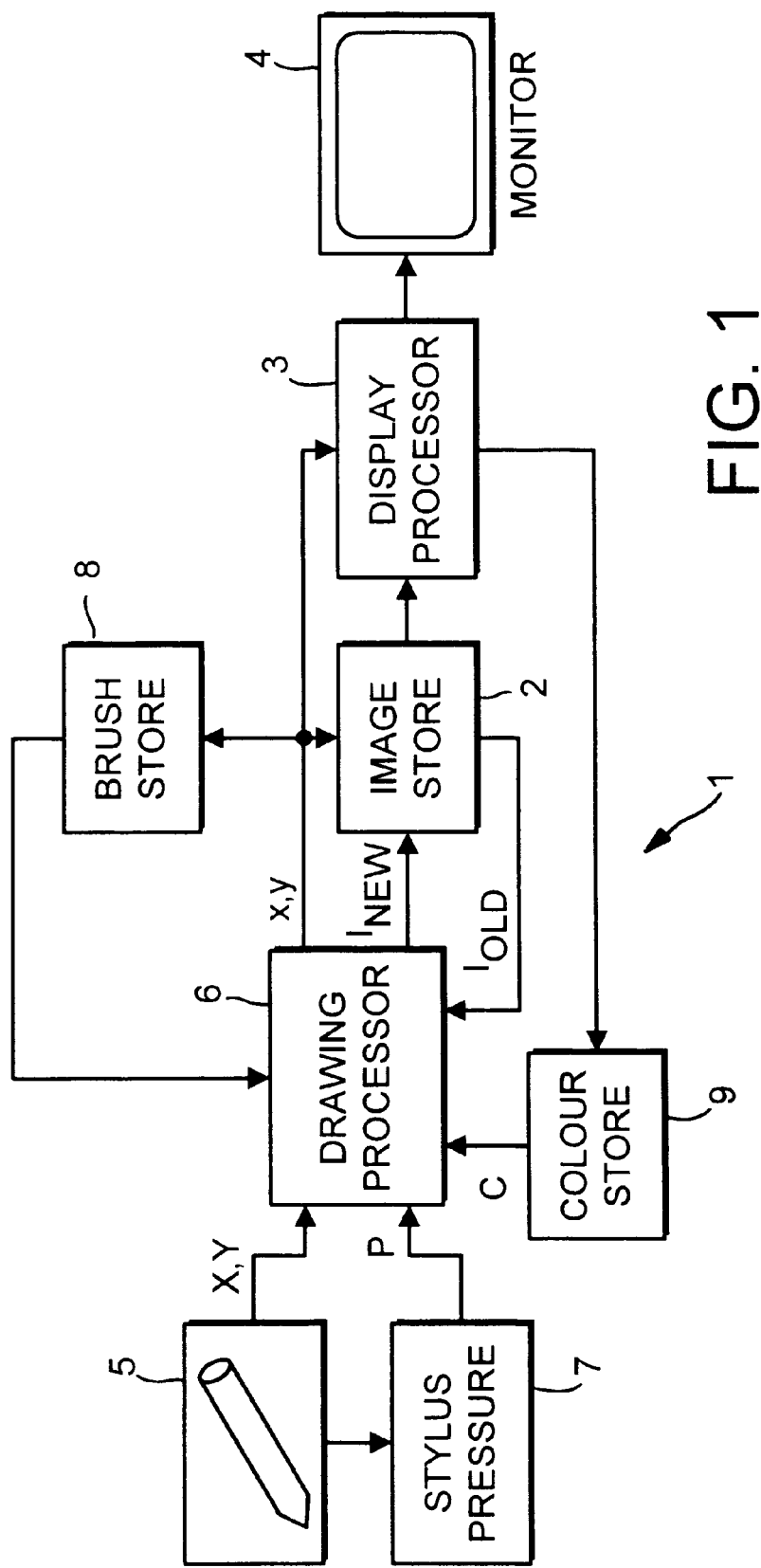
FIG. 1 shows a schematic diagram of an electronic graphic system embodying the invention.

Referring now to FIG. 1 of the accompanying drawings, an electronic graphic system, indicated generally at 1, comprises an image store 2 for storing data defining one or more images including an image being painted, a display processor 3 and a monitor 4. The contents of the image store 2 are read continuously in raster sequence via a serial access port by the display processor 3 and the thus scanned data is output by the display processor 3 for display of the image represented thereby on the monitor 4.

The system 1 also comprises a user operable stylus/touch tablet device 5 by which the user can modify the image data in the store 2, and hence the image represented thereby. As the stylus is drawn across the touch tablet signals representative of the instantaneous position X,Y of the stylus are output to a drawing processor 6. The display processor 3 and the drawing processor 6 are shown as separate entities in order to facilitate understanding by simplifying the following explanation. In practice the two processors 3, 6 may be provided as a single processing unit.

The position information X,Y is provided at a higher resolution than that of the image store 2. That is to say, the spacing between adjacent addresses in the store 2 is significantly larger than the spacing between adjacent positions on the touch tablet 5. It follows that for a given pixel location in the store 2 there are a number of corresponding positions on the touch tablet 5. For example, the spacing between adjacent positions on the touch tablet may be say eight times smaller than that between adjacent addresses in the store 2, and thus there will be sixty four touch tablet positions corresponding to one pixel address in the store. The drawing processor 6 is arranged among other things to convert the instantaneous X,Y position information from the stylus/touch tablet 5 into data representing an equivalent location in the store. The equivalent location is defined in terms of a store address and an offset. The offset is calculated as the difference between the store address and the position X,Y of the stylus on the touch tablet. The offset has both vertical and horizontal components each having a value of less than one pixel. In the above example the offset would have component values which are integer multiples of ⅛.

As the user moves the stylus on the touch tablet the position data X,Y is continuously generated by the touch tablet 5 and delivered to the drawing processor 6 where it is converted into x,y data identifying patches of store addresses in the store 2. Each patch of addresses is centred over the location in the store equivalent to the corresponding X,Y position data generated by the touch tablet.

The stylus of the stylus/touch tablet device 5 also includes a pressure sensor that outputs a pressure related signal for storage as a parameter in a stylus pressure register 7. Modern stylus touch tablet devices are also capable of generating data defining the orientation (twist) and defining the angle of the stylus in relation to the touch tablet. These parameters may be stored as well as or instead of the pressure data in the stylus register for use by the processor.

Notional drawing implements are predefined in the system 1 and are selectable by the user from a menu of options (not shown) generated by the display processor 3 and displayed on the monitor 4. When the user selects a particular implement, data defining a continuous three dimensional shape covering a patch of pixels and representing the profile of the implement, as described in our above mentioned patents, is stored in a brush store 8.

A selection of predefined colours is also provided in the displayed menu and the user may select one of these predefined colours or instead may define a colour of his own choosing. Data representing the selected colour is stored by the display processor 3 in a colour register 9.

The image store 2 also includes random access ports for random access writing or reading of data to and from the store 2 independently of the serial raster reading of data to the monitor 4. As the stylus is moved across the touch tablet, data at each addressed patch is read from the store 2 via the random access read port to the drawing processor 6. At the same time, brush shape data from the brush store 8 and colour data from the colour store 9 are also input to the drawing processor 6. The reading of the brush patch data from the brush shape store 6 and the colour data from the colour register 8 is synchronised to the generation of individual addresses within the patch of addresses by the drawing processor 6 which outputs said patch addresses to the brush store 8 and reads signals from the colour store 9.

In the drawing processor 6 the image data $I_{OLD}$ read from the image store 2 is processed with the colour data C, the brush data B and the stylus pressure data P to produce new image data $I_{NEW}$ which is written back to the image store 2.

One way in which the drawing processor 6 may process the image data is to interpolate the image data $I_{OLD}$ and colour data C using the product of the pressure data and the brush data as an interpolation co-efficient K to produce new data $I_{NEW}$ in accordance with the algorithm $I_{NEW}=KC+(1-K)I_{OLD}$. This processing serves to add data representing a patch of colour to the image data in the store. In the displayed image the patch appears as if an area of colour has been stamped into the image. In the following the read-modify-write operation will be referred to as "stamping". The drawing processor 6 is arranged to stamp colour data into the image data at regular intervals of time or distance. Thus, as the stylus is moved over the touch tablet data representing a series of overlapping patches of colour ("stamps") is added to the image data in the store and appears in the displayed image as a continuous line or stroke.

Figure 2:
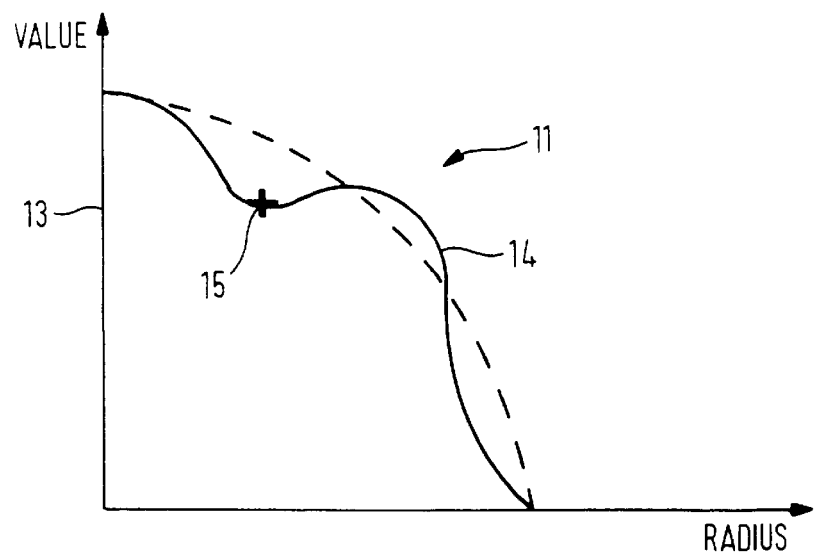
FIG. 2 shows a graph of brush values against brush radius.

The display processor 3 is arranged to output for display on the monitor 4 or a portion thereof data representing a graph 11 such as shown in FIG. 2 of the accompanying drawings. The graph 11 represents the radial profile of a brush selected for use by the user. The brush is circular, and in the graph 11 the horizontal axis represents distance along a radial line from the centre of the brush. The vertical axis 13 represents the value of the brush along the line. The relationship between radius and brush value is represented by a plot 14.

The display processor 3 is also arranged to output for display on the monitor 4 data representing a cursor 15, and to respond to user manipulation of the stylus/touch tablet device 5 by moving the cursor 15 on the monitor 4. In response to the user manipulating the stylus to place the cursor 15 at a point on the plot 14 and pressing down hard on the touch tablet, the display processor 3 is arranged to connect the thus-selected point of the plot with the cursor 15. Subsequent movement of the cursor 15 causes the selected point of the plot 14 to be dragged to a new position. During this dragging operation the revised plot is calculated and displayed on the graph, as represented by the broken line 16 in FIG. 2. Any of the wide range of well known curve-fitting algorithms can be used to calculate the revised plot. In response to the user again pressing the stylus down hard on the touch tablet, the display processor 3 is arranged to change the plot 14 to the new plot 15. The ability to change the profile of the brush in this way enables the user to create a range of custom-built brush profiles by which a range of visually interesting effect may be realised.

Figure 3:
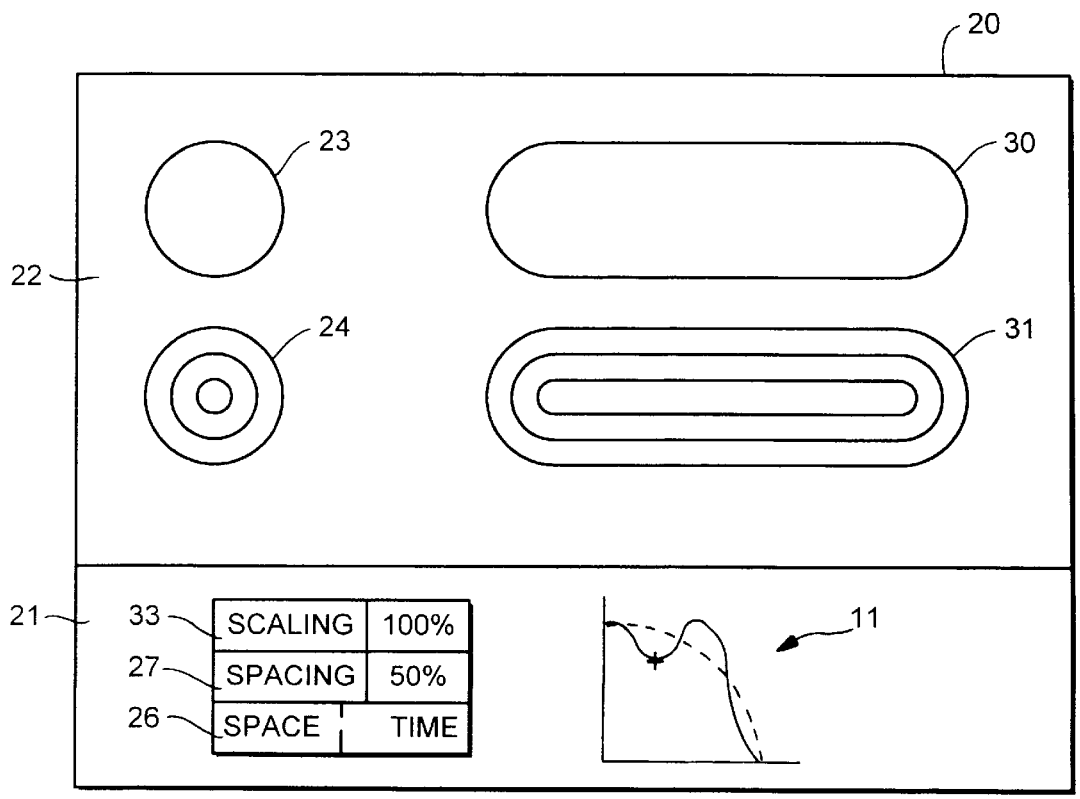
FIG. 3 shows a display depicting various brush and line profiles.

It can be difficult for the user to envisage the effect that manipulating the graph (shown in FIG. 2) will have when the implement defined thereby is used to "paint" into a picture. In order to facilitate the user's understanding, the system is arranged to operate in a preview mode when the graph is to be manipulated. In the preview mode the system generates a display as shown in FIG. 3 of the accompanying drawings. The display generally indicated at 20 comprises a menu portion 21 in which the graph 11 is displayed and an image portion 22 in which various representations of drawing implement are shown.

Two sample brush patches 23, 24 are shown in the image portion 22. Each patch 23, 24 represents the patch that would be "drawn" into an image in the store 2 (see FIG. 1) if the user were simply to touch the stylus onto the touch tablet once at a single point thereon. The uppermost patch 23 (as shown in the drawing) represents the patch that would be created if a conventional (i.e. non-custom) drawing implement were used. The lowermost (as shown) patch 24 represents the patch that would be drawn using the implement defined by the graphic profile 11 displayed in the menu portion 21.

Generally speaking the patch 23 will appear to be of substantially uniform density with the density of the colour reducing at the perimeter of the patch to blend with the colour of the menu background. In contrast, the patch 24 may appear to have irregular density along a radial line, although the density will be uniform along circular lines concentric with and within the patch. This displaying of patches 23, 24 enables the user to compare the effect of his created drawing implement with that of a normal (i.e. non-custom) brush. The display processor 3 is arranged to vary the displayed patch 24 in response to manipulation of the displayed graph 11 by the user thus providing the user with interactive control over the design of a custom brush profile.

Once the data representing the custom brush profile has been defined in the brush store 8 the user is free to use the profile as desired. Clearly, the user may choose simply to use the custom brush as he would any other drawing implement. However, the system 1 is arranged to provide the user with greater control over stamping than would be provided in a normal paining operation. The display processor 3 is arranged to display in the a menu area 21 various control boxes including a space/time box 26 by which the user may selectively toggle space-dependent stamping and time dependent stamping. If space-dependent stamping is selected stamps will occur when the stylus is moved by a defined distance on the touch tablet. In other words, the stamps appear to be regularly spaced in the image displayed on the monitor 4.

A spacing box 27 is also displayed in the menu and when that box is selected the display processor 3 is arranged to respond to user manipulation of the stylus/touch tablet by varying a stamp spacing value between 0% and 100%. Different effects can be achieved depending on the value selected.

In order to enable the user to inspect the effect of varying the spacing by way of the box 27, the display processor 3 is arranged to display two lines 30, 31 in the image portion 22 of the display 20. The line 30 represents the line that would be "drawn" using the reference (normal) drawing implement, and the line 31 represents a sample of the line that would be drawn using the implement defined by the graphical profile 11.

Figure 4:
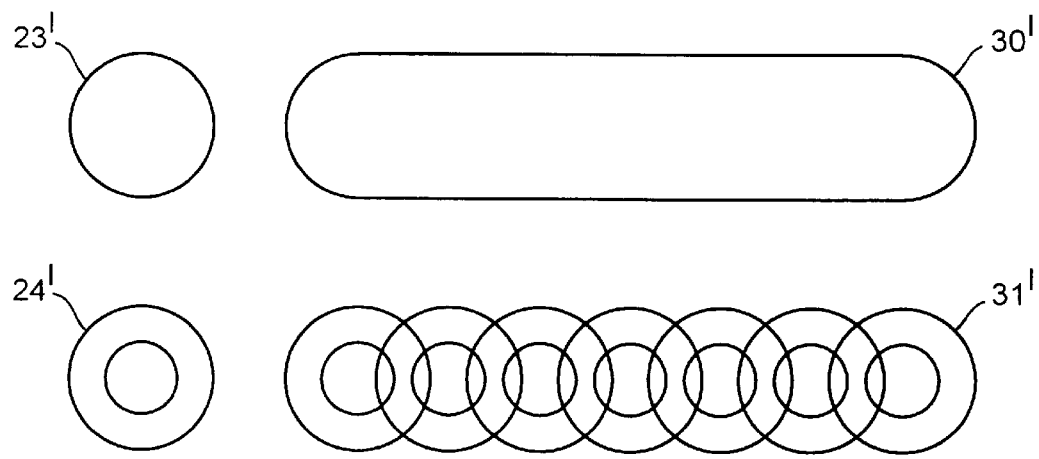
FIG. 4 shows further brush and line profiles.

The appearance of the reference line 30 is constant, but the appearance of the sample line 31 will vary considerably depending on the spacing value selected by the user. If a close spacing is selected, the individual stamps making up the sample line 31 will blend with one another. Consequently, the sample line 31 will, like the patch 24, appear to comprise co-axial paths of uniform density, with the density varying across the width of the line. If, on the other hand, a wide spacing is selected, the individual stamps making up the sample line will be distinctly visible as shown in FIG. 4 of the accompanying drawings. It can be seen from FIG. 4 that line 31' comprises a series of visible patches, the patches in the line 31' clearly correspond to the sample patch 24 shown to the left of the line. The line 30' in FIG. 4 is identical to the line 30 in FIG. 3. That is to say the reference line 30 remains unchanged when the spacing of stamps in the sample line is varied. This enables the user to see how varying the spacing affects the appearance of a line before a line is "drawn" into the image store 2. Of course, the spacing of individual stamps making up the reference line may be varied with the spacing of the stamps in the sample line if so desired.

The two patches 23, 24 as illustrated in FIG. 3 are of equal size. However, depending on how the user has defined the profile in the graph 11, the patch 24 may appear to occupy a smaller area than that occupied by the patch 23. This will occur if the user defines a profile which drops off quickly to zero or has values close to zero before the maximum radius (horizontal axis) of the profile is reached. This, of course, may be intentional on the part of the user, but the user may wish the diameter of the patch 24 and the width of the line 31 to be equal to those of the patch 23 and line 30. Therefore, the menu comprises a scaling box 33 by which the user may increase the diameter of the patch 24 and line 31.

Figure 5:
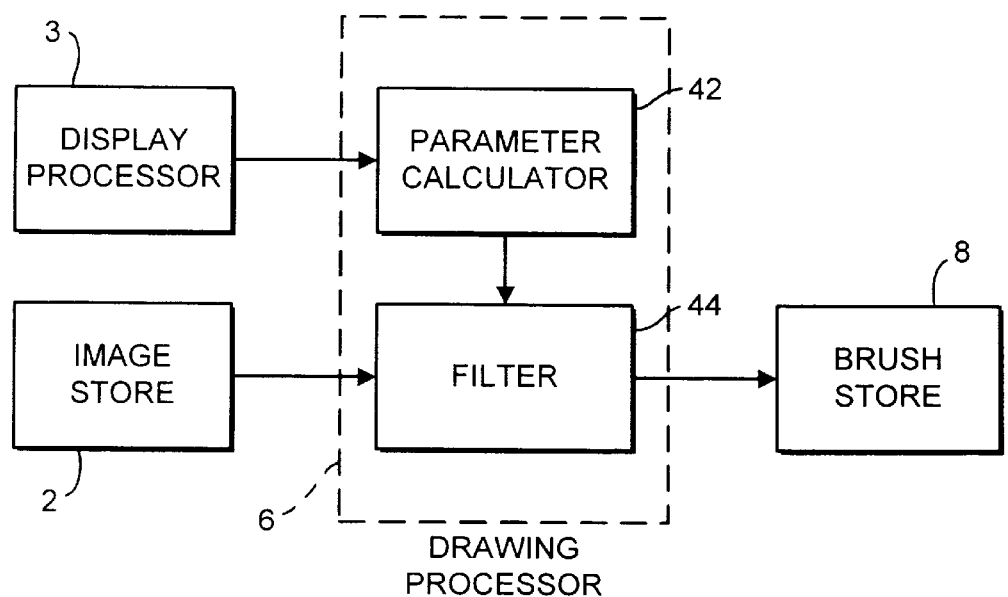
FIG. 5 shows a schematic diagram of a portion of the system of FIG. 1.

To this end as shown in FIG. 5 of the accompanying drawings the drawing processor 6 also comprises a parameter calculator 42 and a spatial digital filter 44. The parameter calculator 42 receives from the display processor 3 data defining the desired size of the patch 24, as determined by the value selected by the user in the scaling box 23. The full size of patch 24 is known and corresponds to the size of the brush store 8. The parameter calculator 32 calculates from the ratio a set of parameters for use by the filter 44.

The design of spatial digital filters is per se well known and is described for example in co-pending British Patent Application No. 9518443.8 the teachings of which are incorporated herein by reference. The purpose of the filter is to enlarge (or reduce) the size (in terms of the number of pixels) of the area covered by the patch 24 so that the patch 24 appears to be of the same size as the patch 23. Filtering is necessary to ensure that as the data defining the drawing implement is changed in size there is no aliasing which would create unwanted artifacts. Thus, data in the brush store 8 representing a user defined implement is converted by filtering into data representing a smaller or larger (in terms of area) version of the same implement.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

What is claimed is:

1. An electronic graphic system comprising:
   an image store for storing in a multiplicity of storage locations data representing a multiplicity of image pixels which when displayed together form an image;

a user operable input device for generating control data in response to user operation thereof;

an implement data store for storing data defining a patch of implement pixels which together represent a profile of a drawing implement;

a processor connected to receive the control data from the user operable input device and responsive to the control data to identify a patch of storage locations in the image store, to read image data from the patch of storage locations, to modify the thus read image data using the patch of implement pixels in the implement data store and to write the thus modified image data back to the patch of storage locations in the image store, whereby in response to continuous operation of the input device a series of overlapping patches of image data are modified to create data representing a line in the image; and a monitor for displaying an image represented by data input thereto, and wherein the system is operable in a preview mode in which display data is derived from the data in the implement data store, which display data defines an image comprising a graphical representation of the profile of the drawing implement, and in response to operation of the user operable input device to effect modifications to the graphical representation of the profile and corresponding to the data in the implement data store, the image defined by the display data further comprising an image defined by the data in the image store in response to control data corresponding to the single position being generated by the user operable input device, the system in the preview mode thereby enabling a user specified implement profile to be defined.

2. A system as claimed in claim 1, wherein the image displayed in the preview mode further comprises an image of a single patch that would be created in the image using implement data defining a reference implement.

3. A system as claimed in claim 1, wherein the image displayed in the preview mode further comprises an image of a line that would be created in the image represented by the data in the image store using the implement data in the implement data store in response to control data corresponding to a line of positions being generated by the user operable input device.

4. A system as claimed in claim 3, wherein the or each line comprises a series of overlapping patches corresponding to the patch associated respectively with the or each line, the processor being operable to vary the spacing between adjacent patches in the or each line depending on control data input by operation of the user operable input device.

5. A system as claimed in claim 1, wherein the image displayed in the preview mode further comprises an image of a line that would be created in the image represented by the data in the image store using implement data defining a reference implement in response to control data corresponding to a line of positions being generated by the user operable input device.

6. A system as claimed in claim 5, wherein the line comprises a series of overlapping patches corresponding to the patch associated respectively with the or each line, the processor being operable to vary the spacing between adjacent patches in the or each line depending on control data input by operation of the user operable input device.

7. A system as claimed in claim 1, wherein the processor is operable to generate data defining a graphical representation of a drawing implement profile, the processor being responsive to operation of the user operable input device to vary the data defining the graphical representation and to generate said implement data therefrom.

8. A system as claimed in claim 1, further comprising:

a filter for filtering image data, the filter being operable to filter said implement data depending on control data from the user operable input device to vary a size of the patch in the image displayed on the monitor in the preview mode.

9. A system as claimed in claim 8, wherein said filter comprises a parameter calculator for calculating filtering parameters to be applied to said brush data depending on control data input by operation of said user operable input device.

10. A system as claimed in claim 1, further comprising an implement store for storing the generated implement data.

11. A system as claimed in claim 1, further comprising an image store for storing data representing an image, and wherein the user operable input device is operable to generate coordinate data identifying coordinates in the image store, and the processor is operable to process data in the image store by reading a patch of initial image data from the store at a location related to the position represented by the position data, modifying the patch of image data with the implement data and so writing the patch or modified data back to the store to replace the patch of initial data.

12. A system as claimed in claim 1, further comprising a store for storing other image data, and wherein said processor is operable to modify the patch of image data by combining the same with the other image data depending on the implement data.

13. A system as claimed in claim 12, wherein said other image data represents a selected colour.

14. A system as claimed in claim 1, wherein said user operable input device comprises a stylus and touch tablet device.

15. An electronic graphic method comprising:

storing in a multiplicity of storage locations of an image store data representing a multiplicity of image pixels which when displayed together form an image;

generating control data in response to user operation of an input device;

storing in an implement data store data defining a patch of implement pixels which together represent a profile of a drawing implement;

receiving the control data from the user operable input step and responsive to the control data identifying a patch of storage locations in the image store, to read image data from the patch of storage locations, modifying the thus read image data using the patch of implement pixels and writing the thus modified image data back to the patch of storage locations in the image store, whereby in response to continuous operation of the input device a series of overlapping patches of image data are modified to create data representing a line in the image; and displaying on a monitor an image represented by data input thereto, and operating in a preview mode in which display data is derived from the data in the implement data store, which display data defines an image comprising a graphical representation of the profile of the drawing implement, and responsive to operation of the user operable input device to effect modifications to the graphical representation of the profile and corresponding to the data in the implement data store, the image defined by the display data further comprising an image defined by the data in the image store in response to control data corresponding to the single position being generated by the user operable input device, the system in the preview mode thereby enabling a user specified implement profile to be defined.

16. A method as claimed in claim 15, wherein the image displayed in the preview mode further comprises an image of a single patch that would be created in the image using implement data defining a reference implement.

17. A method as claimed in claim 15, wherein the image displayed in the preview mode further comprises an image of a line that would be created in the image represented by the data in the image store using the implement data in the implement data store in response to control data corresponding to a line of positions being generated by the user operable input device.

18. A method as claimed in claim 17, wherein the line comprises a series of overlapping patches corresponding to the patch associated respectively with the or each line, the method further comprising a step of varying the spacing between adjacent patches in the or each line depending on control data input by the user operable input.

19. A method as claimed in claim 15, wherein the image displayed in the preview mode further comprises an image of a line that would be created in the image represented by the data in the image store using implement data defining a reference implement in response to control data corresponding to a line of positions being generated by the user operable input device.

20. A method as claimed in claim 19, wherein the line comprises a series of overlapping patches corresponding to the patch associated respectively with the or each line, the method further comprising a step of varying the spacing between adjacent patches in the or each line depending on control data input by the user operable input.

21. A method as claimed in claim 15, further comprising generating data defining a graphical representation of a drawing implement profile, and responsive to the user operable input varying the data defining the graphical representation, and generating said implement data therefrom.

22. A method as claimed in claim 15, further comprising:
a filtering step for filtering image data, to filter said implement data depending on control data from the user operable input to vary the size of the patch in the image displayed on the monitor in the preview mode.

23. A method as claimed in claim 22, further comprising a step for calculating filtering parameters to be applied to said brush data depending on control data input by said user operable input.

24. A method as claimed in claim 15, further comprising a step of storing the generated implement data in an implement store.

25. A method as claimed in claim 15, further comprising: storing in an image store data representing an image and wherein the user operable input generates coordinate data identifying coordinates in the image store, processing data in the image store by reading a patch of initial image data from the store at a location related to the position represented by the position data, modifying the patch of image data with the implement data and so writing the patch of modified data back to the store to replace the patch of initial data.

26. A method as claimed in claim 25, further comprising storing other image data, and modifying the patch of image data by combining the same with the other image data depending on the implement data.

27. A method as claimed in claim 26, wherein said other image data represents a selected colour.

* * * * *